(12) United States Patent
Krishnan et al.

(10) Patent No.: US 9,549,068 B2
(45) Date of Patent: Jan. 17, 2017

(54) METHODS FOR ADAPTIVE VOICE INTERACTION

(71) Applicant: Simple Emotion, Inc., Portland, OR (US)

(72) Inventors: Akash Krishnan, Portland, OR (US); Matthew Fernandez, Portland, OR (US)

(73) Assignee: Simple Emotion, Inc., Portland, OR (US)

( * ) Notice: Subject to any disclaimer, the term of this patent is extended or adjusted under 35 U.S.C. 154(b) by 2 days.

(21) Appl. No.: 14/607,649

(22) Filed: Jan. 28, 2015

(65) Prior Publication Data

US 2015/0213800 A1 Jul. 30, 2015

Related U.S. Application Data

(60) Provisional application No. 61/932,696, filed on Jan. 28, 2014.

(51) Int. Cl.
*G10L 25/00* (2013.01)
*H04M 3/51* (2006.01)
*H04M 3/493* (2006.01)
*H04M 3/523* (2006.01)
*G10L 25/63* (2013.01)
*H04M 3/22* (2006.01)

(52) U.S. Cl.
CPC ............ *H04M 3/5166* (2013.01); *G10L 25/63* (2013.01); *H04M 3/4936* (2013.01); *H04M 3/5232* (2013.01); *H04M 3/2218* (2013.01)

(58) Field of Classification Search
USPC .................................. 704/231–257, 270–275
See application file for complete search history.

(56) References Cited

U.S. PATENT DOCUMENTS

| | | | |
|---|---|---|---|
| 5,583,961 | A | 12/1996 | Pawlewski et al. |
| 5,749,073 | A | 5/1998 | Slaney |
| 6,173,260 | B1 | 1/2001 | Slaney |
| 6,226,328 | B1 | 5/2001 | Assuncao |
| 6,529,866 | B1 | 3/2003 | Cope et al. |
| 6,598,020 | B1 * | 7/2003 | Kleindienst ............ G10L 13/08 704/270 |
| 6,691,090 | B1 | 2/2004 | Laurila et al. |
| 6,845,359 | B2 | 1/2005 | Ramabadran |
| 7,027,979 | B2 | 4/2006 | Ramabadran |

(Continued)

OTHER PUBLICATIONS

Kim, S., Georgiou, et al. Real-Time Emotion Detection System, Using Speech: Multi-modal Fusion of Different Timescale Features. Proceedings of the IEEE Multimedia Signal Processing Workshop (2007). 48-51.

(Continued)

*Primary Examiner* — Jesse Pullias
(74) *Attorney, Agent, or Firm* — Jeffrey Schox; Thomas Gwinn (57) ABSTRACT

A method for adaptive voice interaction includes monitoring voice communications between a service recipient and a service representative, measuring a set of voice communication features based upon the voice communications between the service recipient and the service representative, analyzing the set of voice communication features to generate emotion metric values, and generating a response based on the analysis of the set of voice communication features.

16 Claims, 4 Drawing Sheets

(56) References Cited

U.S. PATENT DOCUMENTS

| | | | |
|---|---|---|---|
| 7,035,791 B2 | 4/2006 | Chazan et al. | |
| 7,035,797 B2 | 4/2006 | Iso-Sipila | |
| 7,058,570 B1 | 6/2006 | Yu et al. | |
| 7,058,889 B2 | 6/2006 | Trovato et al. | |
| 7,222,075 B2 | 5/2007 | Petrushin | |
| 7,283,962 B2 | 10/2007 | Meyerhoff et al. | |
| 7,340,393 B2 | 3/2008 | Mitsuyoshi | |
| 7,451,079 B2 | 11/2008 | Oudeyer | |
| 7,627,475 B2 | 12/2009 | Petrushin | |
| 7,684,984 B2 * | 3/2010 | Kemp | G10L 15/065 704/235 |
| 7,756,874 B2 | 7/2010 | Hoekman et al. | |
| 7,940,914 B2 | 5/2011 | Petrushin | |
| 8,054,964 B2 * | 11/2011 | Flockhart | G10L 17/26 379/265.07 |
| 8,130,935 B1 | 3/2012 | Coughlan et al. | |
| 8,180,638 B2 | 5/2012 | Kim et al. | |
| 8,214,214 B2 | 7/2012 | Bennett | |
| 8,412,526 B2 | 4/2013 | Sorin | |
| 8,538,755 B2 | 9/2013 | Bollano et al. | |
| 2002/0010584 A1 | 1/2002 | Schultz et al. | |
| 2002/0194002 A1 | 12/2002 | Petrushin | |
| 2003/0023444 A1 | 1/2003 | John | |
| 2003/0115055 A1 | 6/2003 | Gong | |
| 2004/0143435 A1 | 7/2004 | Deng et al. | |
| 2004/0249639 A1 | 12/2004 | Kammerer | |
| 2005/0114142 A1 * | 5/2005 | Asukai | A61B 5/16 704/270 |
| 2005/0286705 A1 | 12/2005 | Contolini et al. | |
| 2006/0122834 A1 * | 6/2006 | Bennett | G10L 15/1822 704/256 |
| 2006/0143010 A1 | 6/2006 | Han et al. | |
| 2007/0025540 A1 * | 2/2007 | Travis | H04M 3/5232 379/219 |
| 2007/0094009 A1 | 4/2007 | Ryu et al. | |
| 2008/0249774 A1 | 10/2008 | Kim et al. | |
| 2008/0288255 A1 | 11/2008 | Carin et al. | |
| 2009/0191521 A1 | 7/2009 | Paul et al. | |
| 2009/0208913 A1 | 8/2009 | Xu et al. | |
| 2009/0313019 A1 | 12/2009 | Kato et al. | |
| 2010/0088088 A1 | 4/2010 | Bollano et al. | |
| 2010/0185446 A1 | 7/2010 | Homma et al. | |
| 2011/0178803 A1 | 7/2011 | Petrushin | |
| 2011/0206198 A1 | 8/2011 | Freedman et al. | |
| 2011/0295607 A1 | 12/2011 | Krishnan et al. | |
| 2012/0065961 A1 | 3/2012 | Latorre et al. | |
| 2013/0024016 A1 | 1/2013 | Bhat | |
| 2013/0132088 A1 * | 5/2013 | Kim | A61B 5/165 704/270 |
| 2014/0140496 A1 | 5/2014 | Ripa et al. | |
| 2014/0140497 A1 | 5/2014 | Ripa et al. | |
| 2014/0163960 A1 * | 6/2014 | Dimitriadis | G10L 17/26 704/9 |

OTHER PUBLICATIONS

Lee, C. M. et al., Classifying emotions in human-machine spoken dialogs. International Conference on Multimedia & Expo '02, (2002). 1,737-740.

Nwe, T. et al., Speech emotion recognition using hidden Markov models. Elsevier Speech Communications Journal, (2003). 41(4), 603-623.

Petrushin, V., Emotion in Speech: Recognition and Application to Call Centers. Artificial Neural Networks in Engineering '99. (1999). 7-10.

Schuller, B., et al. The interspeech 2009 emotion challenge. Proceedings of Interspeech 2009, (2009). 1,312-315.

* cited by examiner

METHODS FOR ADAPTIVE VOICE INTERACTION

CROSS-REFERENCE TO RELATED APPLICATIONS

This application claims the benefit of U.S. Provisional Application Ser. No. 61/932,696, filed on 28 Jan. 2014, which is incorporated in its entirety by this reference.

TECHNICAL FIELD

This invention relates generally to the speech-processing field, and more specifically to new and useful methods for adaptive voice interaction in the speech-processing field.

BACKGROUND

The speech-processing field is a rapidly growing field used across many industries. Current methods of adaptive voice interaction often require substantial training and large amounts of computational resources, and they often suffer from accuracy issues. Providing a novel solution for the speech-processing field that can address these issues would greatly improve many of the applications of adaptive voice interaction and could enable new applications as well. Thus, there is a need in the speech-processing field to create a new and useful method for adaptive voice interaction. This invention provides such a method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
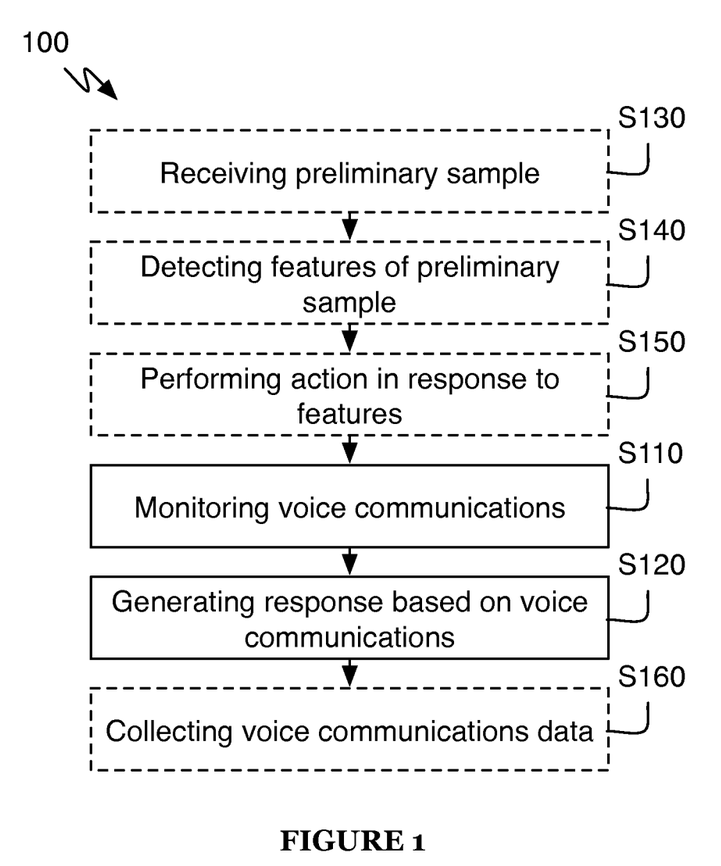
FIG. 1 is a flowchart representation of a method of a preferred embodiment.

As shown in FIG. 1, a method 100 for adaptive voice interaction includes monitoring voice communications S110 and generating a response based on the voice communications S120. The method 100 may additionally include receiving a preliminary voice sample S130, detecting features of the preliminary voice sample S140, performing an action in response to the features S150, and/or collecting voice communications data S160.

The method 100 is preferably implemented by a computer system or electronic device capable of monitoring voice communications. For example, the method 100 could be implemented by servers in a call center that route and monitor calls, by a smartphone virtual assistant app, by servers in the cloud for a conference calling service, or by any other implementation leveraging voice communications. In a call center, the method 100 could be used to pair customers (or other service recipients) with service representatives (SRs), help route customers through menus, or provide options to both customer and SRs to improve the quality of service. Some examples of service representatives are customer service representatives, sales representatives, and any other persons who perform or aid in the performance of a service via the use of a call center. Additionally, the method could be used in a call center to help assess and train SRs, improving quality of service and efficiency. In a smartphone virtual assistant app, the method 100 could be used to provide feedback and make decisions based not only on words spoken by a user, but also on detected emotions, learned patterns, audio subtext, or other features or content. Virtual assistants preferably include any computer interactive voice response (WR) systems.

Step S110, which includes monitoring voice communications, functions to track and analyze features and/or content of voice communications. The voice communications are preferably voice communications over a telephone connection, but may alternatively be voice communications over the internet, over an intercom system, within a native application or operating system, or any other suitable type of voice communications in which a microphone or other means can be used to monitor the voice communications. The voice communications are preferably between a human and an automated computer system, but may alternatively be between any number and combination of humans, animals, and computer systems. Monitoring voice communications preferably occurs in real-time (as voice communications occur) but may alternatively occur at any other time. For example, a conversation between a customer and a service representative (SR) could be monitored as the conversation happened in real-time. As an alternative example, a recorded conversation between two people could be monitored at any time after the conversation was recorded. Monitoring preferably occurs for all available voice communications data, but may alternatively only occur for some available voice communications data. Available voice communications are preferably any voice communications available for analysis or monitoring to a system performing the method 100. For example, in a conversation between a customer and a SR, monitoring preferably occurs for both speech from the customer and the SR, but may alternatively only occur for speech by one of the two parties. Similarly, monitoring can be performed for more than two parties, such as during a conference call. Monitoring preferably also occurs at all times for which voice communications are available, but may alternatively only occur at some times for which voice communications are active. For example, monitoring of a conversation may occur for the entire conversation or for only a part of that conversation.

Monitoring preferably includes tracking features of voice communication. Features of voice communication preferably include statistical features such as average minimum fundamental frequency, average amplitude, intensity, tempo, and any other suitable statistical features. Features of voice communication preferably also include Mel-frequency cepstral coefficients (MFCCs). Features of voice communication may alternatively include Relative Spectral Transform (RASTA) features, Perceptual Linear Prediction (PLP) features, RASTA-PLP features, or any other features describing voice communications. Features are preferably extracted from voice communication in real-time. Real-time MFCC feature extraction is preferably enabled by the methods described in U.S. Patent Application Publication No. 2011/0295607, which is incorporated in its entirety by this reference. Features are preferably extracted repeatedly over time for the voice communications (e.g. a minimum fundamental frequency feature extracted for each looms of communication). Extracted features are preferably linked to extraction timing (e.g. it is known that a particular feature occurred between six hundred milliseconds after the start of conversation and seven hundred milliseconds after the start of conversation) but alternatively may be unlinked to extraction timing.

Monitoring may alternatively or additionally include tracking content of voice communications. Content of voice communications preferably includes raw content (e.g. recorded audio of voice communications) and derived content (e.g. words spoken during voice communications or a transcript of voice communications). Derived content is preferably generated from raw content but may alternatively also be generated from features of voice communications or any other suitable source. Derived content is preferably generated automatically but may alternatively be generated manually (as in the case of a human taking a transcript of an audio recording).

Monitoring preferably includes storing all monitored voice communications, but may alternatively include storing only some monitored voice communications or storing none at all. Storing preferably involves storing a digital record of voice communications on a computer storage device, but may alternatively include any other storing method.

Monitoring preferably includes analyzing features of voice communication. Analyzing features preferably includes making comparisons between features and references, and determining conclusions from the comparisons. Alternatively, analyzing features may include any method of determining conclusions from a combination of features and additional relevant information. Monitoring preferably also includes analyzing content of voice communications. Analyzing content preferably includes making comparisons between content and references and determining conclusions from the comparisons. Alternatively, analyzing content may include any method of determining conclusions from a combination of content and additional relevant information.

References are preferably stored in a reference database, but alternatively may be stored in any other manner. References preferably include data relevant to features or content to be compared. For example, a reference for an MFCC feature may be another MFCC feature. As another example, a reference for a fundamental frequency may be a range of fundamental frequencies.

References preferably are linked to other data; for example, references may be linked to demographic or identification data (age, gender, culture, etc.), emotion data, data linked to actions, or any other suitable data. For example, a fundamental frequency reference may include a range of frequencies linked to a particular emotion. As a second example, a content reference may include a sound clip of an eighty-year old speaker (thus linking the sound clip to the age). As a third example, an MFCC reference may be linked to a high probability that a caller will hang up a phone. References are preferably linked to multiple types of data; for example, the sound clip of the eighty year old speaker may be linked to not only the speaker's age, but also to the speaker's gender and culture. References are preferably of a single type (e.g. a single feature or single content clip) but may alternatively be of multiple types. For example, a reference linked to anger may include both an MFCC feature and a statistical feature. Comparisons of features or content to references can occur in many different ways. Determining conclusions from these comparisons can also occur in many different ways. As a first example, a feature may simply be compared to one reference. From that comparison, it can be determined to what extent the feature matches the reference (e.g., the measured feature and the reference have a calculated eighty-six percent similarity). From this, further conclusions can be determined, such as the extent to which the feature corresponds to data linked to the reference (e.g., eight-six percent similarity with a reference linked to a predicted speaker age range of 20-30 implies a ninety-eight percent chance that the speaker is within the age range). As a second example, a feature may be compared to multiple references. As a third example, multiple features may be compared to a single or multiple references. Features and references are preferably linked to timing, but alternatively may not be linked to timing. Conclusions are preferably derived from these comparisons using a set of rules, but may alternatively be derived using a machine learning algorithm, a neural network, or any other suitable method. As an example of deriving conclusions from comparisons using a set of rules, a feature may be associated with a particular emotion by comparing that feature to a set of references associated with different emotions and then selecting the emotion linked with the reference most similar to the feature. Conclusions are preferably derived directly from features or content, but may alternatively be derived indirectly. For example, conclusions may be derived from a pattern or combination of already derived information; if a customer's speech is determined to be male and that customer's speech is identified as first sad and then angry, that customer may be linked to a high probability of hanging up the phone. In addition to hang-up risk, customers may be linked to other important metrics such as attrition risk or upsell success rates. Conclusions may also be derived from a combination of features, content, derived information and external information. External information is any information known to a system running the method 100, but not part of voice communication. For example, external information might include how many buttons a customer has pressed; how long a customer has waited; how many times a customer has called in the past; or known information about a customer such as age or address. Conclusions determined as part of monitoring are preferably stored in memory of a computer system, but alternatively may be stored in any other way or not stored.

Figure 2:
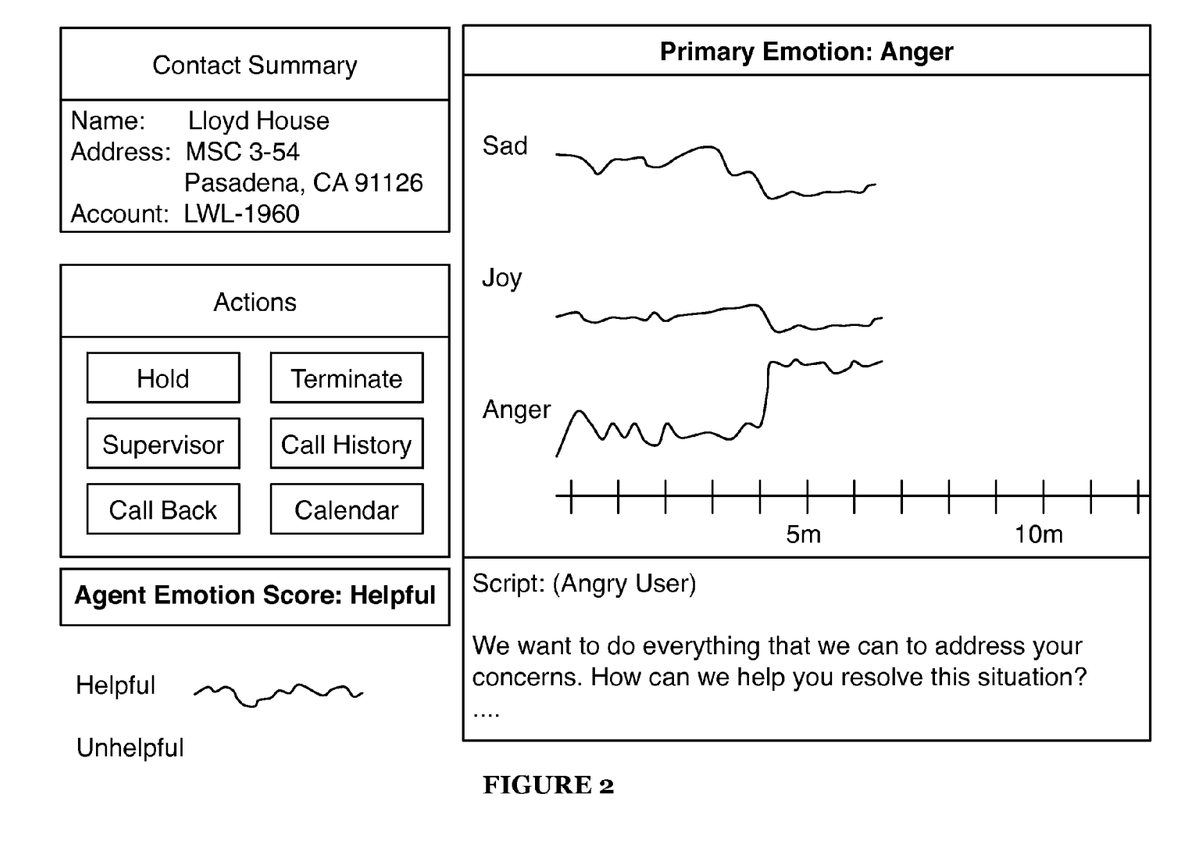
FIG. 2 is an example representation of an emotion monitoring interface presented to a service representative.

Conclusions derived by Step S110 may be used to assess the emotional state of persons involved in voice communication. In one embodiment, Step S110 includes generating emotion metric values for persons involved in voice communication (e.g., customer, SR, virtual assistant user, etc.). These emotion metric values represent the extent to which a person may be experience certain emotions. For example, a SR may have access to a panel that plots emotion metric values versus time for emotions like sadness, joy, and anger, as shown in FIG. 2.

Emotion metric values are preferably determined from multiple comparisons. For example, Step S110 may include generating emotion metric values at a rate of 2 Hz, but performing feature comparisons at a rate of ioHz (e.g., each emotion value generated is based on five feature comparisons). Additionally or alternatively, emotion metric values may be determined from single comparisons (i.e., emotion metric value generation rate and feature comparison rate are equal).

Conclusions derived by Step Siio may also be used to generate a more general emotional state or emotional state score; for example, if a person is primarily experiencing anger, his or her emotional state may be described as angry. As another example, as shown in FIG. 2, an SR may be evaluated in general on an emotional state score linked to helpfulness; this may be calculated based on the degree to which the SR expresses empathy.

Step S120, which includes generating a response based on the voice communications, functions to respond to information derived while monitoring voice communications. Generating is preferably done by a computer system implementing the method 100, but may alternatively be done by any suitable system or means. Responses are preferably generated in response to particular events (e.g., a rule being triggered or a certain amount of time elapsing) but may alternatively be generated manually (e.g., by a SR). Responses are preferably generated according to a set of rules, but alternatively may be generated according to a machine learning algorithm, a neural network, manual input, or by any other suitable method. Responses are preferably generated based on conclusions derived from monitoring the voice communications, but alternatively may be based on any other input. For example, a response may be generated based on a caller's emotions (as derived from the voice communication) or on known demographic information not resulting from the voice communications (for example, if a phone number is linked with demographic information). Responses are preferably actions directly affecting the voice communications, but may alternatively be any type of response. For example, if monitoring of voice communications by a call center system between a customer and a SR results in derived information indicating the customer is older than sixty years of age and is most likely angry, the SR may receive a pop-up window on his or her computer linking to tips for dealing with the situation or presenting a script for dealing with the situation. As a first alternative example, the SR may receive an option to switch the customer to another SR specially trained to deal with older customers. As a second alternative example, the call center system may automatically transfer the customer to another SR. As another example, if monitoring results in derived information indicating that a customer prefers deeper voices, the voice of the SR may be altered to sound deeper. Responses preferably include displaying information to a SR or other call center employee if the method 100 is implemented in a call center. A graphical user interface used by a SR will preferably display the information in an application or website used to control SR communication and/or interactions. Responses including displaying information preferably allow interaction with the response. For example, if a response includes displaying information to a SR, that SR may be able to comment on or rate the information. More specifically, if the call system displays a message like "The customer seems to be angry. Do you agree? [y/n]", the SR can provide opinions that can be used either in later response generation or for training purposes. As another example, if a response includes displaying information to a SR, that SR may be able to take manual action after the response; more specifically, the call system may display a message like "The customer seems to be angry. Would you like to transfer the call to a manager? [y/n]" and allow the SR to transfer the call. Similarly, the response may attach meta-data to a session identifier of the call, which can be used to impact subsequent management of the call. For example, if the SR provided a response confirming the caller is upset, the call session could be marked for preference towards more senior SR in subsequent call handling. Responses preferably occur during voice communication but may also occur at any other time; for example, a response may include sending a text message to a caller that has hung up. Responses preferably are used to modify, affect, or inform voice communications as they occur, but may alternatively be used for other purposes. For example, a SR may be given a break after dealing with a particularly emotional customer, or may accumulate performance points for consistently handling calls where positive emotion is consistently detected.

Step S130, which includes receiving a preliminary voice sample, functions to capture an initial voice sample. Receiving a preliminary voice sample preferably occurs at the beginning of voice communication. Receiving is preferably integrated with another task; for example, a call center system may ask for a caller to speak his or her account number. In this example, the initial voice sample would be later processed both for features (e.g. emotion) and content (e.g. the actual account number). Alternatively, receiving may be separate from other tasks; a call center system may simply ask for the caller to say his or her name without later parsing the content. In this example, the name is not actually determined from the voice sample; the voice sample is simply processed for features. Receiving preferably includes recording the initial voice sample, but alternatively the received voice sample may not be recorded and may instead be processed in real-time.

Step S140, which includes detecting features of the preliminary voice sample, functions to detect and perform analysis on features of the preliminary voice sample. A first optional substep of Step S140 includes detecting content of the preliminary voice sample. Detecting features preferably includes detecting features such as statistical features, MFCCs, or any other suitable features. Detecting content preferably includes detecting raw content as well as derived content. Features and content are preferably detected in a substantially similar manner to Step S110, but may alternatively be detected in any other suitable manner. Detecting preferably includes analyzing and deriving information from any detected content or features. Analyzing and deriving information are preferably substantially similar to the analyzing and deriving described in Step S110.

Step S150, which includes performing an action in response to the features, functions to respond to any detected features or content. Performing the action is preferably substantially similar to Step S120. Step S150 is preferably used to set up voice communications, but alternatively may be used for any other suitable purpose. For example, the features detected may be used to route a caller in a specific way through a call system. As a more specific example, an initial voice sample from a caller to an English-speaking call center may indicate that the caller is a non-native speaker; in response, the caller may be matched with a bilingual SR.

Step S160, which includes collecting voice communications data, functions to collect and analyze data on voice communications to be used at a later time. Voice communications data preferably includes any information derived in Step S110. Voice communications data preferably also includes any other data relevant to voice communications; for example, voice communications data may include a customer's rating of a call after the completion of the call. Voice communications data may also include qualitative information describing the call or the customer; preferably as recorded by an SR or other caller. Voice communications data preferably includes voice communications content (both raw and derived), voice communications features and voice communication actions (e.g., how many buttons a customer pressed during a call). Voice communications data preferably includes data monitored by Step S110, but may additionally or alternatively include data not monitored by Step S110. Voice communications data preferably includes data collected after and/or linked to generating a response. For example, if a caller is routed to a different menu option, any data collected after that point could be used to judge the success of that routing option. If a routing option results in higher caller satisfaction or shorter call time, that option may be used more often. Collecting voice communications data preferably includes storing the voice communications data. Collected voice communications data preferably includes both short-term data and long-term data. Short-term data is preferably analyzed and discarded after analysis; the results of analysis are preferably stored. For example, short-term data may include the raw audio of an entire conversation that is analyzed and then discarded. Short-term data is preferably discarded either a set amount of time after being stored or a set amount of time after analysis on the data is completed, but may alternatively be discarded for any reason at any time. Long-term data is preferably only discarded when no longer used, but may alternatively be discarded for any reason at any time. Voice communications data is preferably stored in databases to be used for Step S110 and Step S120. Voice communications data is preferably linked with data and stored as references in the databases. Voice communications data is preferably also used as input to monitoring voice communications (Step S110) and generating a response (Step S120). This input is preferably in the form of an input to a machine learning algorithm or other algorithm, but may alternatively be input in the form of references for comparison or any other suitable input. Voice communications data is preferably used to modify algorithms or rules used in Steps S110 and S120. Voice communications data is preferably linked with data automatically using derived information, but may alternatively be linked to data manually. For example, after a call, a SR may tag portions of a conversation where a caller was angry. In this way, the database can be trained. Data linking could be integrated into a tagging algorithm that prompts for tags at certain times or after certain events during or after a call. Collecting voice communications data preferably includes linking data to specific communicators. For example, in a call center, a database linking certain voice communications data to particular SRs might be used to generate profiles for each SR. Then, when a customer calls in, he or she could be matched to a particular SR by an estimated compatibility between the customer and the SR. This database could also be used to measure performance or other characteristics of SRs.

In a variation of a preferred embodiment, Step S160 may include processing voice communication data to determine metrics, such as success rate metrics. For example, if an SR is presented with a particular script intended to upsell the customer, Step S160 preferably includes storing whether the upsell was successful or not. This data can be used (individually or in aggregate) to assist in determining overall success rates of given strategies (e.g., presenting given scripts to SRs, pairing customers with SRs based on emotion scores), which can in turn be used to modify how responses are generated by Step S120.

Figure 3:
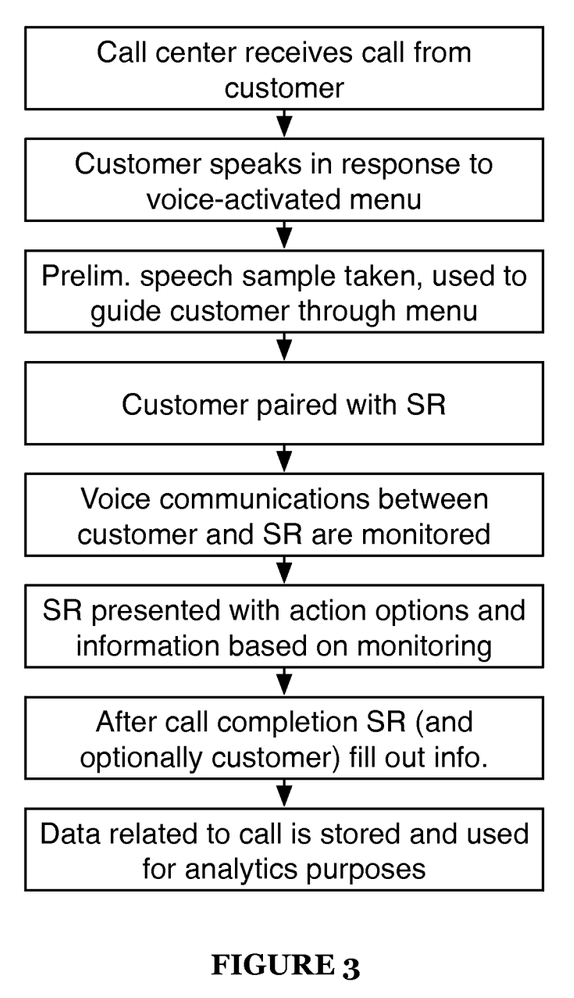
FIG. 3 is a flowchart representation of a first example use of a method of a preferred embodiment.

As shown in FIG. 3, a first exemplary implementation of the method 100 can be applied to a call center. In this example, when a customer calls the call center, he or she is first presented with a voice-activated menu. As the customer navigates through the menu using his or her voice, his or her voice is monitored. This monitoring informs the routing of the customer through the menu. If the customer reaches an option requiring assistance, the customer is asked for his or her name. The voice data from the name is analyzed and used to match the customer with a SR, as well as provide that SR with information about the customer. After being connected with the SR, the SR is provided with real-time information derived from the caller's speech and options for responding to that information (e.g., as shown in FIG. 2). The SR is also provided with information about his or her own speech and is given tips for communicating with the customer. After completing the call, the SR is asked to tag certain data collected during the call, and the customer is asked to complete a survey. Data from both of these actions is stored and used in later monitoring and response generation. Over time, the data is also used to rate the performance of the SR and provide insight on how the SR can improve.

Figure 4:
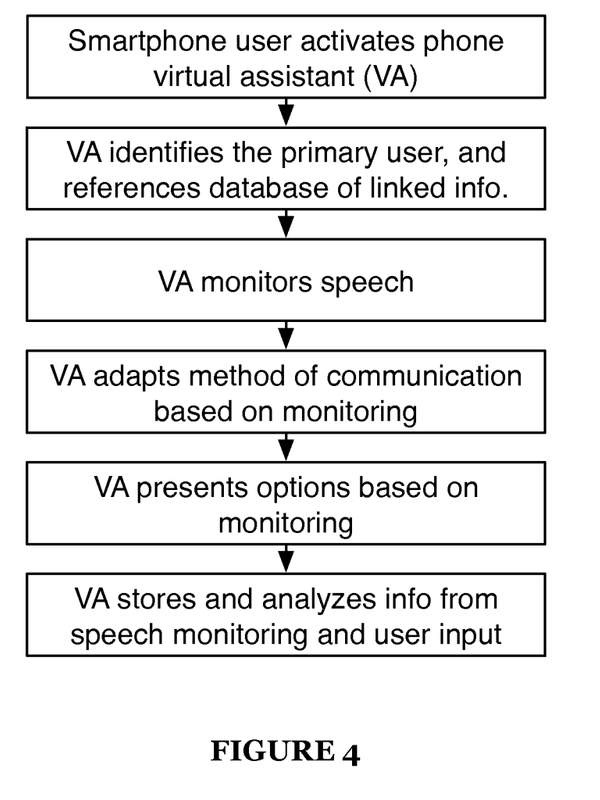
FIG. 4 is a flowchart representation of a second example use of a method of a preferred embodiment.

As shown in FIG. 4, a second exemplary implementation of the method 100 can be applied to a virtual assistant of a computing device. The virtual assistant is preferably a user interaction interface of an application or an operating system, wherein a user can issue spoken commands or carry on a dialogue with the virtual assistant to control the device or get information from the device. The virtual assistant identifies the user as the primary user of the device and draws on a database of personalized information for that user (if the user was not the primary user a different database, algorithm, or set of rules would be used). The virtual assistant chooses its computer voice based on the speech of the user as well as databases stored for that user (or other general databases). If the user becomes angry, the virtual assistant presents the user with a simplified set of options. If the virtual assistant detects that the user may be impaired by drug or alcohol use, the assistant may offer an alternative set of options; for example, the assistant may say, "Abnormal slurring is detected in your speech, you may be impaired. Can I call you a taxi?" The virtual assistant adapts the volume and tempo of its speech based on the speech of the user; for example, if the user speaks more quietly, the volume of the virtual assistant may also be reduced. The virtual assistant also adapts to environmental noise; for example, if the virtual assistant is in a loud environment it may display the communication as text on the phone screen; but if it is in a quiet environment it may simply speak in response to user speech. Additionally or alternatively, environmental noise may be used for performing analysis; for example, background voices may be analyzed for emotion metric values, and these values may be used as contextual information in calculating emotion metric values for the user. The virtual assistant learns from normal use, but also learns for input from the user; for example, the assistant may ask a user "Is your native language Russian?" and store the response to that in a database for further use.

The methods of the preferred embodiment and variations thereof can be embodied and/or implemented at least in part as a machine configured to receive a computer-readable medium storing computer-readable instructions. The instructions are preferably executed by computer-executable components preferably integrated with a computer system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for adaptive voice interaction comprising:
receiving a preliminary voice sample from a service recipient during a first phone call;

detecting a first set of features of the preliminary voice sample during the first phone call;

selecting, in real-time and during the first phone call, a service representative based on analysis of the first set of features; wherein selecting a service representative based on analysis of the first set of features comprises selecting the service representative without first identifying the service recipient;

monitoring voice communications between the service recipient and service representative; wherein monitoring comprises measuring and analyzing a second set of features periodically during the voice communications; and displaying, in real-time, conclusions drawn from analysis of the second set of features to the service representative; wherein displaying conclusions to the service representative comprises displaying, during and prior to cessation of the first phone call, a likelihood metric that the service recipient may terminate voice communications with the service representative.

2. The method of claim 1, wherein displaying conclusions comprises displaying conclusions about the service recipient's emotional state.

3. The method of claim 1, further comprising displaying communications prompts to the service representative; wherein the communications prompts are selected based on analysis of the second set of features.

4. The method of claim 3, wherein the second set of features comprises MFCC features; wherein analyzing the second set of features comprises:
dividing the MFCC features into MFCC subsections;
sorting the MFCC subsections;
computing an emotional state score from a comparison of the MFCC subsections and a set of selected reference samples; and
determining a probable emotional state from the emotional state score.

5. A method for adaptive voice interaction comprising:
monitoring first voice communications between a service recipient and a service representative; wherein monitoring comprises measuring a first set of features at each of a first set of time intervals during the first voice communications; and
analyzing the first set of features during and prior to cessation of the first voice communications; wherein analyzing comprises generating emotion metric values for each of a second set of time intervals, based on measurements of the first set of features; wherein each of the second set of time intervals corresponds to a non-zero integer number of time intervals of the first set of time intervals, wherein generating emotion metric values comprises generating at least one of a predicted attrition risk metric and a predicted upsell success metric.

6. The method of claim 5, wherein generating emotion metric values comprises comparing measurements of the first set of features to feature references.

7. The method of claim 6, wherein the first set of features comprises MFCC features; wherein the feature references comprise MFCC feature data linked to emotion data.

8. The method of claim 5, further comprising displaying a script to the service representative; wherein the script is selected from a set of scripts based on the emotion metric values.

9. The method of claim 5, further comprising recording event data corresponding to a communication event, and linking the event data to emotion metric values.

10. The method of claim 9, further comprising determining a success rating for the event data, and using the success rating to update a profile linked to the service representative.

11. The method of claim 9, further comprising determining a success rating for the event data, and using the success rating to predict success rates for future communication events.

12. The method of claim 11, further comprising displaying a script to the service representative; wherein the script is selected from a set of scripts based on predicted success rates.

13. A method for adaptive voice interaction with a virtual assistant comprising:
monitoring first voice communications spoken by a user to a virtual assistant operating on an electronic device; wherein monitoring comprises measuring a first set of features at each of a first set of time intervals during the first voice communications;
analyzing the first set of features; wherein analyzing comprises generating emotion metric values for each of a second set of time intervals, based on measurements of the first set of features; wherein each of the second set of time intervals corresponds to a non-zero integer number of time intervals of the first set of time intervals; and
responding, with the virtual assistant, to the user based upon the emotion metric values, wherein responding to the user comprises presenting the user with a set of user responses based upon the emotion metric values.

14. The method of claim 13, further comprising detecting environmental noise; wherein responding to the user comprises responding, with the virtual assistant, to the user based upon the emotion metric values and the environmental noise.

15. The method of claim 13, further comprising limiting access to the electronic device based upon the emotion metric values.

16. The method of claim 13, wherein the first set of features comprises MFCC features; wherein the feature references comprise MFCC feature data linked to emotion data.

* * * * *

UNITED STATES PATENT AND TRADEMARK OFFICE
CERTIFICATE OF CORRECTION

PATENT NO. : 9,549,068 B2
APPLICATION NO. : 14/607649
DATED : January 17, 2017
INVENTOR(S) : Akash Krishnan and Matthew Fernandez Page 1 of 1

It is certified that error appears in the above-identified patent and that said Letters Patent is hereby corrected as shown below:

In the Specification

In Column 2, Line 66, "looms" should read "100ms"
In Column 4, Line 54, "ioHz" should read "10Hz"
In Column 4, Line 60, "Siio" should read "S110"

Signed and Sealed this
Twenty-eighth Day of March, 2017

Michelle K. Lee
*Director of the United States Patent and Trademark Office*